Jan. 20, 1970 F. M. O. FÖRSTER 3,491,288

MAGNETIC NONDESTRUCTIVE TESTING SYSTEM WITH
ENDLESS TAPE RECORDING MEANS

Filed Oct. 25, 1967 6 Sheets-Sheet 1

Friedrich M. O. Förster,
INVENTOR.
BY.

ATTORNEY.

Jan. 20, 1970 F. M. O. FÖRSTER 3,491,288

MAGNETIC NONDESTRUCTIVE TESTING SYSTEM WITH ENDLESS TAPE RECORDING MEANS

Filed Oct. 25, 1967 6 Sheets-Sheet 3

3,491,288
Patented Jan. 20, 1970

3,491,288

MAGNETIC NONDESTRUCTIVE TESTING SYSTEM WITH ENDLESS TAPE RECORDING MEANS

Friedrich M. O. Förster, 144 Der Schoene Weg, 741 Reutlingen, Germany

Filed Oct. 25, 1967, Ser. No. 678,069
Int. Cl. G01r 33/12
U.S. Cl. 324—37 4 Claims

ABSTRACT OF THE DISCLOSURE

The present invention relates to nondestructive testing of the type wherein a workpiece is magnetized and the resultant magnetic pattern is recorded on a magnetic medium such as a recording tape and a test signal is subsequently reproduced by a magnetic pickup scanning the recording tape. The embodiment of the invention disclosed herein is especially adapted for inspecting the seam in welded pipe for defects in the weld. Means are provided for indicating the type and size of any defects, whether the defects can be repaired and if so the extent and nature of the repairs.

One commonly accepted method of testing materials, such as the welded seam in a welded pipe, is the so-called magnetic method. When using this method a magnetic field is produced in the workpiece by some suitable means. For example, a current may be circulated through the workpiece or the workpiece may be passed through between the pole faces of a magnetic yoke. If there are any magnetic discontinuities in the workpiece (for example a crack, void, inclusion, etc.) there will be corresponding disturbances in the stray magnetic field on or above the surface of the workpiece. By locating disturbances in the stray fields it is possible to locate discontinuities in the workpiece. One common means of identifying the existence and location of stray flux fields is to utilize finely divided magnetic particles. These particles which may be in the form of a fine dry powder or suspended in a liquid, are spread across the surface of the magnetized workpiece. If there are no stray fields, most of the particles do not adhere to the workpiece. Any particles that do adhere are usually of relatively small amounts and substantially uniformly distributed in more or less random patterns across the workpiece. However, if there are any stray fields at least a portion of the magnetic particles are attracted into patterns corresponding to the stray field. By observing these patterns a skilled operator may locate most magnetic discontinuities.

Although this form of testing has been used extensively and is reasonably accurate, it has several serious objections which have limited its usefulness. First of all, it is essentially a manual operation and as a consequence is slow and entirely dependent upon the ability of an operator to visually observe all of the magnetic particle patterns. Secondly, assuming the operator observes all of the magnetic particle patterns it is necessary for the operator to very quickly decide whether the patterns are actually produced by a magnetic discontinuity in the workpiece or are of a random nature resulting from a sticky or rough surface etc. This problem is particularly acute when inspecting rough irregular surfaces, such as a welded seam. Thirdly, assuming the particles are in fact attracted by a stray magnetic field, it is virtually impossible for an operator to accurately determine the characteristics of the discontinuity. For example, it cannot be determined whether a small particle pattern is caused by a weak stray field resulting from a very large defect buried deep beneath the surface or from a small and insignificant discontinuity on the surface. Moreover since the magnetic patterns are of a temporary nature no permanent record is provided for the test results. Also since the inspection is basically a manual operation it is not capable of being readily integrated into modern high speed and/or automatic systems.

Another way of identifying the existence and location of stray flux fields is to scan the surface of the magnetized workpiece with a pickup probe. When the probe passes through any stray fields it produces a corresponding electrical signal which can be used to identify the source of the field. In those instances where a probe of this nature can be used this type of inspection can be carried out at relatively high rates of speed and on a substantially automatic basis without any manual interpretation. However, the strength of a stray field decreases very rapidly as the distance above the surface of the workpiece increases. As a consequence the probe must be maintained very close to and uniformly spaced from the surface to obtain a strong and consistent signal. As a result the use of magnetic inspection systems utilizing stray field probes has been confined primarily to inspecting workpieces having smooth and/or machined surfaces.

Inspection systems utilizing magnetic pickup probes have not been suitable for inspecting workpieces having rough and irregular surfaces as it is extremely difficult, if not impossible, to properly guide a probe across the irregular surface with a sufficiently large clearance space to avoid collision with any irregularities, while at the same time maintaining the clearance space sufficiently small and constant to produce a strong and consistent signal.

It has also been found systems utilizing stray magnetic pickup probes have not been entirely suitable for distinguishing between certain types of discontinuities such as small and immaterial surface cracks and very large and objectionable defects located deep beneath the surface. As a consequence the use of magnetic inspection systems utilizing magnetic pickup probes has been primarily limited to inspecting workpieces having relatively smooth surfaces and workpeces having primarily only one type of defect such as surface cracks.

Although the foregoing limitations have not been particularly objectionable in some application, they have been very important with regard to the inspection of certain types of workpieces and certain types of discontinuities. For example, welded pipe is fabricated by forming a strip of metal into a cylindrical shape and then welding the adjacent sides together. This leaves a welded seam the entire length of the pipe. The acceptability of the pipe is dependent upon the entire seam being of high quality and free from any discontinuities, such as inclusions, voids, etc. In the event the weld includes a defect such as a crack on the outside, it is possible to remove the defect by rewelding the involved part of the seam. However, in order to remove the defect it is necessary to know the location, size, depth, etc. of the defect.

A properly magnetized pipe will produce stray magnetic fields around the types of discontinuities most normally present in a welded seam. However, heretofore magnetic inspection of welded seams and particularly in pipes has not been satisfactory. As explained above, it has been extremely difficult, if not impossible, to reliably identify the exact characteristic of a defect by means of the magnetic particle method, particularly on rough and irregular surfaces, such as a weld. It is also extremely difficult, if not impossible, to scan a magnetic pickup probe across such an irregular surface.

In order to overcome the foregoing difficulties and provide means capable of inspecting rough and irregular surfaces, it has been proposed to place a magnetic medium, such as a flexible magnetic tape, on the surface of the workpiece whereby any stray magnetic fields are recorded upon the tape. The tape is then scanned by a magnetic probe to sense and/or measure the recorded stray fields and indicate the presence of defects. A system of this nature is disclosed and claimed in copending application Ser. No. 641,659, filed May 26, 1967 by Friedrich M. O. Forster entitled Magnetic Nondestructive Testing System. The system of said application is particularly adapted for inspecting workpieces such as steel billets for defects that are located on or very near the surface, i.e. defects such as seams, laps etc. The system employs an endless magnetic belt or tape rolled the length of the workpiece and whereby any stray fields are recorded upon the belt. As the belt rolls from the workpiece it is scanned by a rotating probe so as to produce signals corresponding to any defects. Since the defects of primary interest are in or on the surface of the billet, the system is particularly adapted for locating and identifying surface defects. The magnetic belt in such a system is capable of traveling along the rough and irregular surface of a welded seam and recording any stray fields produced by surface defects and subsurface defects. However, the system is not especially adapted for distinguishing between certain types of defects, such as those on the surface and those which are buried deep within the weld.

The present invention provides means for overcoming the foregoing difficulties. More particularly, the present invention provides means for inspecting workpieces having rough and irregular surfaces such as the beading of a welded seam in a pipe and identifying only the discontinuities which are objectionable defects. At the same time it indicates whether or not the defect can be repaired and if it can, the extent of repairs required.

The particular embodiment of the present invention disclosed herein is especially adapted for inspecting the welded seam in a pipe. The system includes an inspection head wherein an endless flexible magnetic belt rolls along the seam and records stray fields and a pickup probe scans the belt to produce signals corresponding to the recorded fields. In addition the system includes means responsive to the reproduced signals for determining whether the defect is in or near the outside surface (i.e. the surface contracted by the belt) or is buried in the weld beneath the surface. This permits the system to distinguish between a small and immaterial defect on the outside surface and a large and objectionable defect on the inside surface. The location, nature and size of the defect are indicated whereby it can be determined whether the defect can be repaired and if so the nature and amount of the repairs required.

It has been found that under some circumstances a weld may include two discontinuities which are side by side or overlapped. Heretofore it has been very difficult, if not impossible, for a system to distinguish between such defects. As a result it has been common practice to base the inspection results on the nature of one discontinuity or on the sum of the two. If the results are based on a single discontinuity and this is small and acceptable, it is possible for a large and objectionable defect to be ignored. Conversely if the results are based on a sum of the two it is possible to indicate an objectionable defect even though both of the discontinuities are within acceptable limits.

The present invention provides means for overcoming this difficulty. More particularly means are provided which in effect locks onto the signal corresponding to the largest of two overlapping defects and follows this. As a consequence even though one of the discontinuities may be of a minor nature the pipe will still be marked as a defect if (and only if) the largest discontinuity is too large. If both defects are within acceptable limits there will be no indications even though the sum of the signals would exceed an acceptable limit.

In addition the present invention provides means for making a permanent record of the inspection operations. By reviewing this record the accuracy of the inspection can be determined either at the time of inspection or even at a later date, such as a failure of an inspected part. If desired this record may be on a one-to-one scale whereby the recordings may be laid on the pipe for direct comparison with the seam.

These and other features and advantages of the present invention will become readily apparent from the following detailed description of a single embodiment thereof, particularly when taken in connection with the accompanying drawings wherein like reference numerals refer to like parts and wherein.

Figure 1:
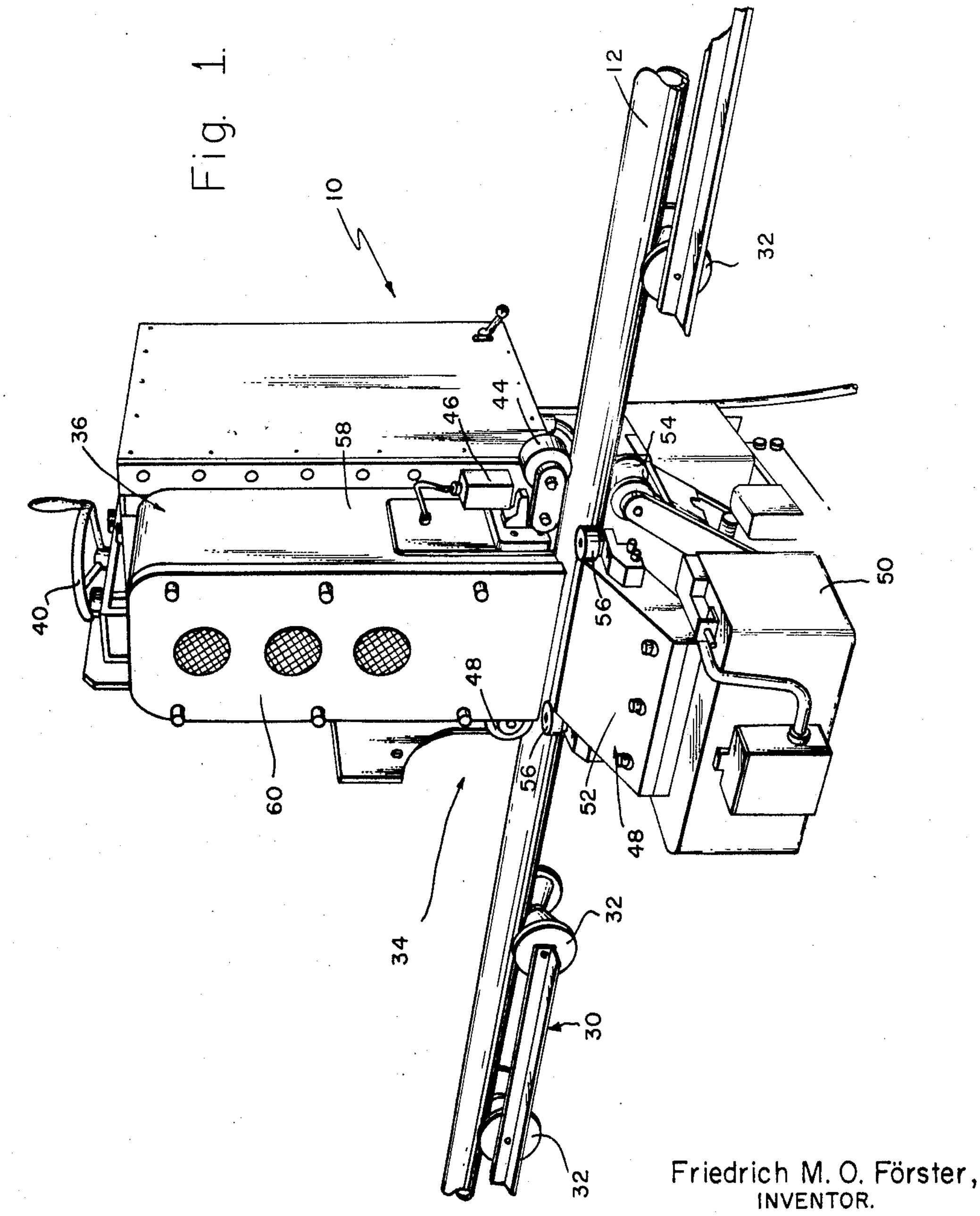
FIGURE 1 is a perspective view of a welded pipe testing system embodying one form of the present invention.

Referring to the drawings in more detail the present invention is particularly adapted for inspecting workpieces at the high rates of speed normally present in modern production processes. Although the workpieces may be of any desired material, size, shape, etc., by way of example this inspection system 10 is especially adapted for inspecting steel pipe 12 of the welded seam variety.

Pipes of this variety are normally formed by rolling or otherwise shaping a flat strip of steel into a cylindrical shape. Following the shaping operation the adjacent edges of the strip are welded together to form a pipe 12. This process may be of an essentially continuous nature whereby a long pipe is formed and cut into shorter sections. Alternatively it may be of an intermittent nature wherein the pipe 12 is formed a section at a time.

Hopefully the weld 14 is of a high uniform quality over the entire length of the pipe. However, under some circumstances the weld 14 may include areas having one or more discontinuities. By way of example, the weld 14 may include various types of cracks, slag inclusions, voids, laminations, etc. It should be noted although these discontinuities are not desirable their presence does not necessarily require the discarding or repairing of the weld 14. It can be appreciated if the discontinuity is so small it does not materially reduce the strength of the pipe and/or the pipe is only lightly stressed it may not be necessary to reject the pipe 12. To really be satisfactory any system for inspecting the quality of a welded seam 14 in a steel pipe 12 must be capable of not only locating any discontinuity but also determining whether or not the discontinuity is within acceptable limits, and if not, whether it can be repaired.

Various standards have been proposed for determining when a discontinuity is acceptable and when it must be repaired or replaced. These standards vary considerably depending upon the quality of the pipe 12, its intended uses, the pressures, etc. According to one standard of grading pipes, as long as a discontinuity does not penetrate to a depth in excess of 12½% of the wall thickness it is acceptable. However, if the pipe 12 contains a discontinuity exceeding this depth it is a defect which must be repaired or rejected.

Figure 7:
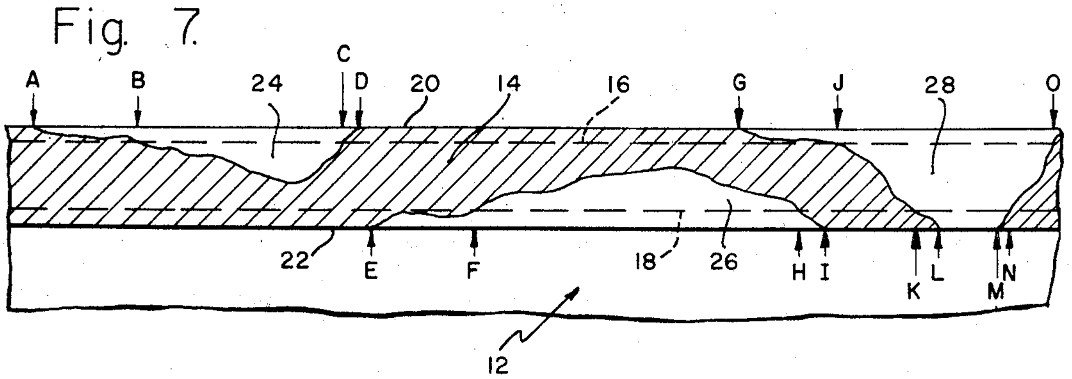
FIGURE 7 is a cross sectional view of a portion of a welded seam in a pipe and having different types of discontinuities therein.

FIGURE 7 is a cross section of a portion of a weld 14 containing several different types of discontinuities. The upper dotted line 16 represents the maximum depth (for example 12½%) to which an acceptable discontinuity may extend inwardly from the outer surface 20. The lower dotted line 18 represents the maximum depth (for example 12½%) an acceptable discontinuity may extend radially outwardly from the inner surface 22.

The left hand portion (FIG. 7) of the pipe 12 includes an outside crack 24 which extends from point A to D. Between points A and B and points C and D the depth of this crack 24 is somewhat less than the acceptable maximum 16. Accordingly, although this portion of the crack 24 may be objectionable in and of itself, it is not of sufficient magnitude to require a rejection of the pipe 12 or repairing the weld 14. However, between points B and C the depth of the crack 24 penetrates beyond the acceptable limit 16. Under these circumstances this portion of the weld 14 must be repaired or the pipe 12 rejected.

The center portion (FIG. 7) of the pipe 12 includes an inside crack 26 which extends radially outwardly from point E to point I. The portions of the crack 26 between points E and F and points H and I have depths less than the acceptable limit 18. However between points F and H the depth of the crack 26 is beyond the acceptable limit 18.

The right hand portion (FIG. 7) of the weld 14 includes a crack 28 which extends from point G to point O. Between points G and I the outside crack overlaps the inside crack 26. Between points L and M the crack 28 extends completely through the weld 14 between the outside surface 20 and the inside surface 22. This is, of course, a complete failure of the weld 14 and must be rejected or repaired.

Normally the discontinuities of an objectionable nature extend in a longitudinal direction of the weld 14 and the pipe 12. In order to locate and identify these discontinuities by magnetic means a magnetic flux field may be created transversely of the welded seam 14. This may be accomplished by circulating a current axially of the pipe 12 whereby the resultant field is in a circumferential direction. Alternatively a pair of magnetic pole faces may be provided adjacent the pipe on the opposite sides of the seam.

When the field extends across a discontinuity a substantial amount of the field extends above the surface 20. This is normally referred to as a stray field. The various characteristics of the stray field are functions of the characteristics of the discontinuity. A crack 24 on or near the outer surface will produce a stray field above the exterior surface 20 having a relatively high flux density, small geometric shape and a relatively high field gradient. A crack 26 on or near the inner surface 22 produces a field above the exterior surface 20 which has a somewhat lower flux density, broader geometric shape and lower field gradient. There are several factors which contribute to this effect. First of all when there is a considerable amount of wall material between the inner crack 26 and the outer surface 20, this tends to spread the field over a broader area and reduce the intensity. Secondly, the distance is greater for the inner crack whereby the field is further broadened and reduced.

For the foregoing reasons the depth or size of a discontinuity cannot be accurately determined by merely measuring the intensity of the stray field. It can also be appreciated for a given size discontinuity the geometric shape and size of the stray field as well as the various field gradients will vary according to the location of the discontinuity relative to the inner and outer surface. A relatively small and acceptable defect in the outer surface 20, such as the crack 24 between points A and B, can produce a field of far greater intensity than a seriously objectionable defect in the inner surface 22, such as the crack 26 between points F and H. Accordingly, by merely measuring the intensity of the stray field it is very difficult, if not impossible, to accurately measure the depth of a defect or determine its location relative to the outer surface 20.

The present system includes a conveyor 30 having a plurality of rollers 32 for carrying the pipe 12 in an axial direction. An inspection station 34 is provided in the conveyor 30 for examining the pipe 12 as it travels therealong.

The inspection station 34 includes an inspection head 36 mounted on a pedestal 38 adjacent the conveyor 30. Means such as a hand crank 40 may be provided for moving the head 36 up and down. This permits adjusting the vertical position of the head 36 to accommodate pipe 12 of widely different size.

In addition means, such as the piston 42, may be provided for raising the head 36 out of the test position. A guide roller 44 mounted on the side of the inspection head 36 rides on the top of the pipe 12 and actuates a switch or valve 46. When a pipe 12 is not passing through the test station 34 the roller 44 drops and actuates the piston 42 to move the head 36 vertically a limited distance above the pipe 12. When the next pipe 12 enters the test station 34 it raises the roller 44 whereby the head 36 is again lowered into the test position. A roller 48 rides on top of the pipe 12 and keeps the head 36 spaced a substantially constant distance from the pipe 12. This arrangement keeps the test head 36 in a constant and uniform relation to the pipe 12 being tested. It also prevents damage to the head 36 as the end of a new pipe enters the inspection station 34.

Any suitable means may be provided for maintaining the pipe magnetized while it passes through the inspection station. As previously mentioned this may be accomplished by circulating a current axially through the pipe. This current may flow during the testing operation or it may be circulated for a short interval prior to the testing whereby only a residual magnetic field is left in the pipe 12 at the time of the test. In the present instance the field is provided by a magnetic yoke 49 mounted on a carrier. A pair of arms 52 extend up around the pipe 12 to form the pole faces 52 of a magnet. The pole faces are adjacent the sides of the pipe 12 whereby the magnetic field extends transversely across the top and through the seam 14.

By this arrangement transverse stray fields are produced above the pipe 12 as it passes under the inspection head 36. The characteristics of the stray fields correspond to the characteristics of the discontinuities as described above, particularly in connection with FIGURE 7 and 8.

A guide roller 54 may be provided below the pipe 12 for raising and lowering the magnet and maintaining the pole faces uniformly spaced relative to the pipe 12. In addition a guide 56 may be provided for riding against the side of the pipe to move the carrier 50 and/or the inspection head 36 laterally as the pipe 12 moves through the inspection station 34.

Figure 2:
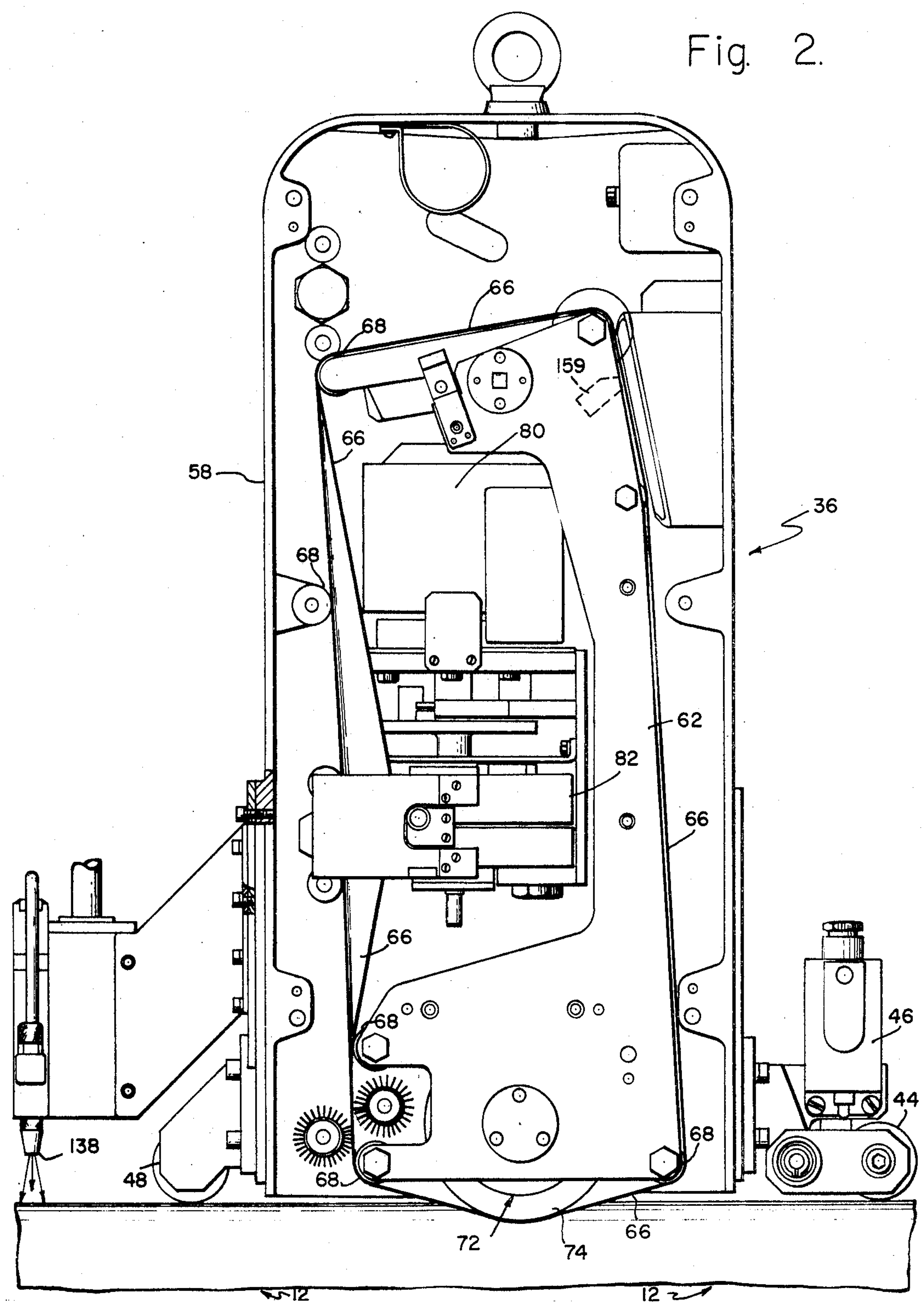
FIGURE 2 is a side view of the inspection station embodied in the system of FIGURE 1.

The inspection head 36 is enclosed in a cabinet 58 having a removeable front panel 60. FIGURE 2 is a front view of the cabinet 58 with the panel 60 removed. A frame 62 is provided inside of the cabinet 58 for carrying the various operative parts.

Magnetic recording means are mounted on the frame 62 for magnetically recording any stray flux fields which may be present in and around the seam 14. In the present instance the recording means 64 includes a loop or endless belt of magnetic tape 66. The tape or belt 66 is supported on one or more rollers 68.

A tension roller 70 engages one corner of the loop and is spring biased to control the tension in the belt 66 and maintain it reasonably tight at all times. This roller 70 may be released so as to swing downwardly to release the tension and allow the belt 66 to be removed or installed.

A pressure or contact roller 72 is provided on the bottom of the frame 62. This roller 72 engages the inside of the belt 66 and forces the outside thereof against the exterior of the pipe 12. Although the pressure roller 72 may be fabricated in any desired manner, the rim or tread 74 is preferably very resilient. By the way of example, the tread 74 may include a sponge rubber or similar material.

This will be effective to force the belt 66 to wrap around the top of the pipe 12 and the welded seam 14 and be compressed thereagainst.

Normally the surface 20 of the pipe 12 and/or the seam 14 are fairly irregular. They are usually covered with bumps, flat spots, hollows etc. However, the exterior of the belt 66 is forced into intimate contact with all parts of the surface 20 including the irregularities by the tread 74.

The belt 66 may be a more or less conventional magnetic recording tape. However, the belt operates in a fairly severe environment and rolls across rough surfaces such as the welded seam 14 and it is exposed to considerable dirt, scale, abrasion etc. It is therefore, desirable to "ruggedize" the belt by embeding or coating magnetic particles on an abrasion resistant, tough plastic material.

Since the belt is firmly pressed against the surface a substantially constant spacing is maintained between the magnetic recording material in the belt and the surface of the pipe. Moreover, this spacing is very small, particularly if the recording material is on the outside of the belt. As a consequence any stray magnetic fields will be recorded at maximum strength. Moreover, the magnitude of the recordings will be substantially uniformly related to the stray field. This insures the recordings having a known relationship to the characteristics of the discontinuities.

As the pipe 12 travels beneath the inspection head 36 the belt 66 naturally tends to travel around the loop. To reduce the drag, friction, loss of synchronism, etc., it may be desirable to provide a motor that drives the belt 66 in synchronism with the pipe 12.

From the foregoing description it may be seen that as the pipe travels through the inspection station 34 the yoke 48 produces a transverse magnetic field across the region of the weld 14. Any resultant stray magnetic fields above the pipe 12 are continuously recorded on the belt 66 whereby a "print" of the stray field is preserved.

Figure 3:
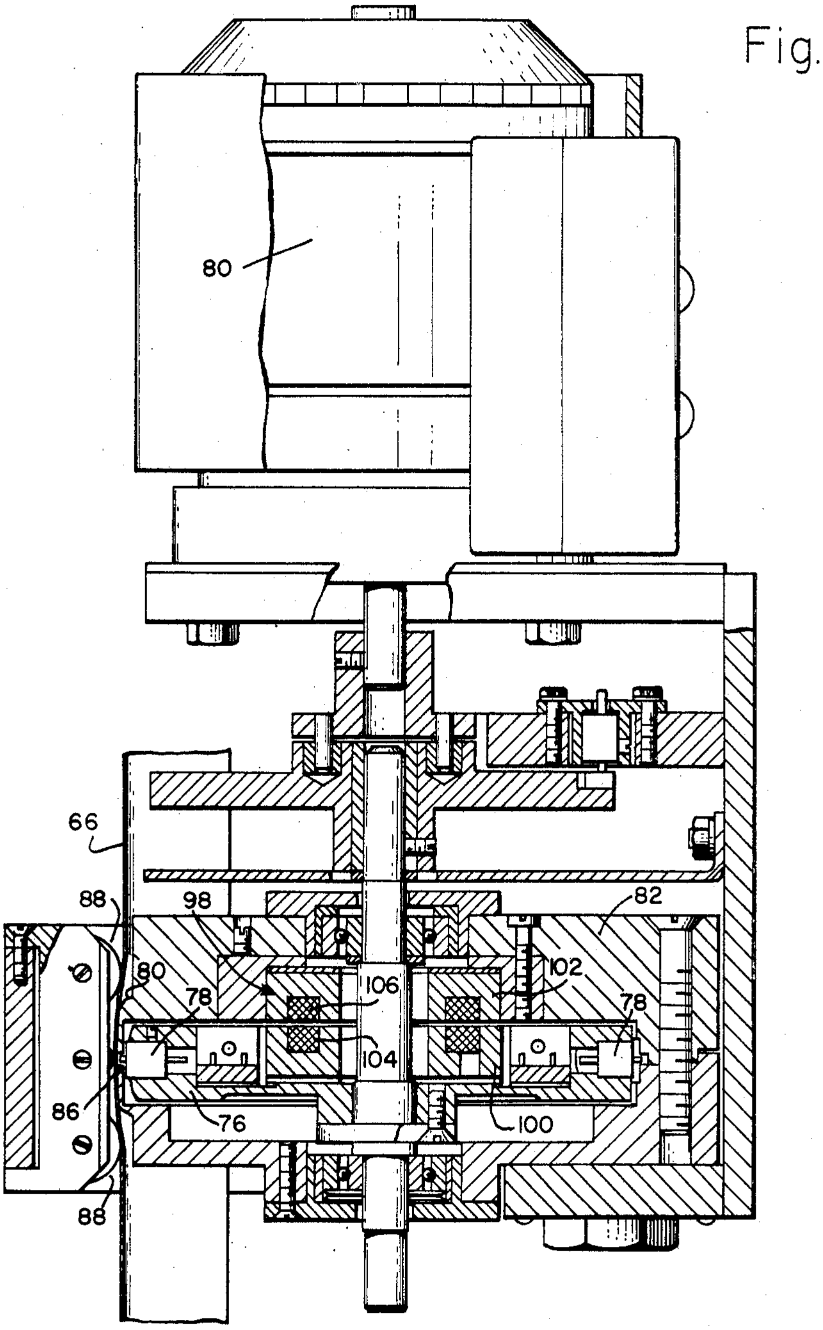
FIGURE 3 is a side view, on a slightly enlarged scale of a portion of the inspection station of FIGURE 2.
Figure 4:
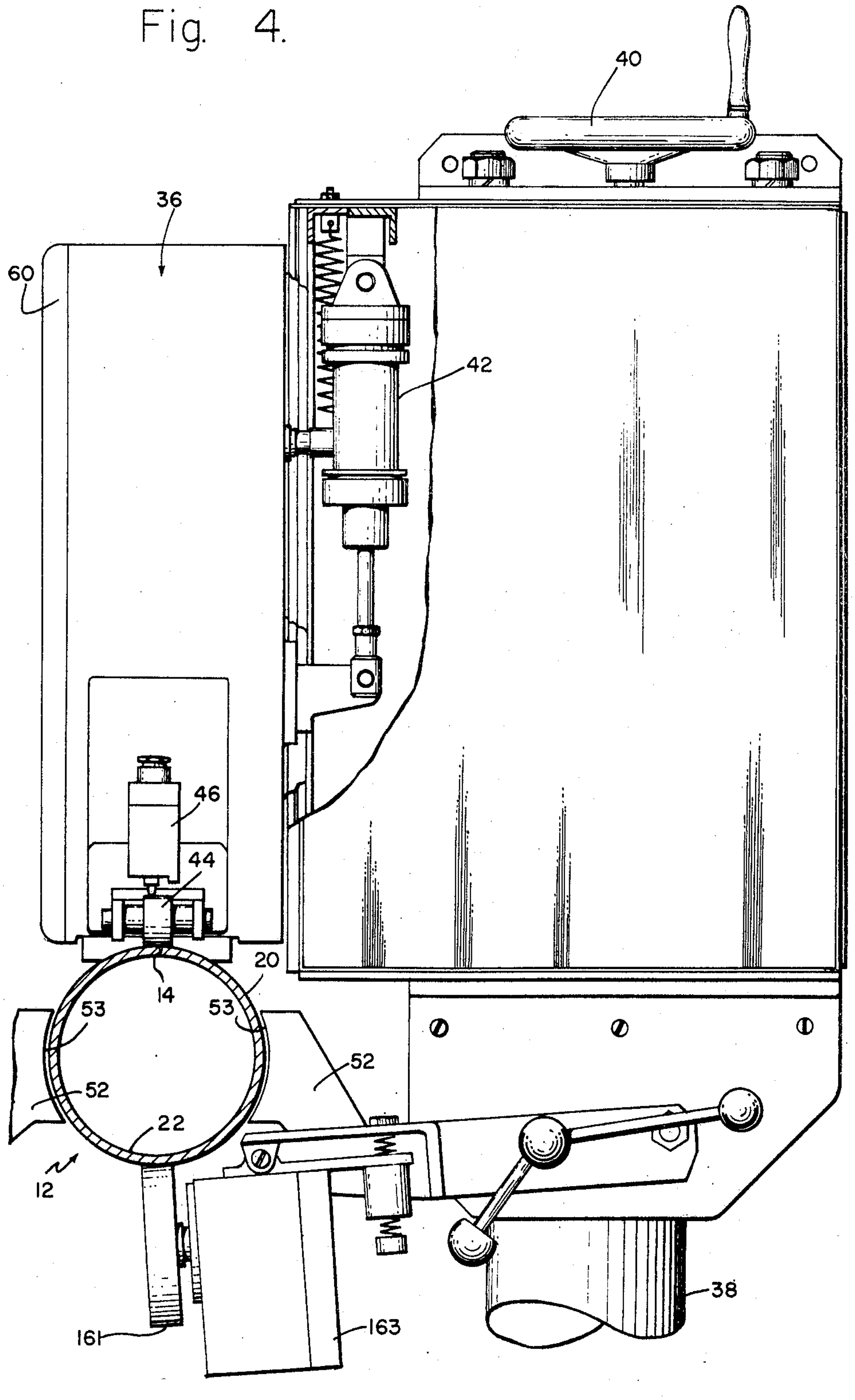
FIGURE 4 is an end view of the inspection station of FIGURE 2, a portion thereof being broken away.

In order to "read" and "print" and produce signals corresponding to the discontinuities, a pickup probe 78 may be provided for scanning across the belt 66 as it travels around the rollers. Although this may be accomplished in any suitable manner, as best seen in FIGURES 2 and 3, a turntable 76 is mounted in the center of the belt 66 in a plane at substantially right angles to the belt. One or more magnetic pickups 78 may be mounted on this turnable 76 and an electric motor 80 provided for rotating the turntable 76. As best seen in FIGURE 3 the motor 80 has its vertical shaft connected by means of a coupling to the vertical shaft carrying the turntable 76. This will cause the pickups to scan transversely across the belt 66 and produce a signal corresponding to the recordings of the stray fields above the pipe 12.

In order to maintain a substantially uniform spacing between the belt 66 and pickup 78, the belt 66 is formed around the face 81 of a cylindrical housing 82 enclosing the turntable 84. The face 81 has a slot 86 aligned with the pickup probe 78 and just outside of its sweep. A plurality of rollers 88 are arranged to press the tape against the face and maintain it properly positioned.

As the pipe 12 moves past the inspection station 34 the belt 66 records the stray field and moves across the slot 86. The pickup probes 78 successively scans across the belt 66 along a series of substantially parallel lines and relationships to the stray fields on the pipe 12.

When the stray field results from a crack the recording it in a narrow strip on the belt 66 and the probe 78 produces a pulse or relatively short duration signal. The duration and frequency components in the signal are in part dependent upon a large number of factors, such as the speed at which the probe 78 is traveling relative to the belt 66, etc. If the crack is in or near the outside surface 20, the stray field has a small geometric shape, a relatively large flux density and a high field gradient. Accordingly, the signal has a relatively short duration, a large amplitude and a considerable amount of high frequency components. In contrast if the crack is in or near the inside surface 22 the field is geometrically broader, of lower intensity and has a lower field gradient. As a consequence the signal tends to be of somewhat longer duration and lower amplitude. Also the signal has a considerably smaller proportion of high frequency components.

Figures 5, 6:
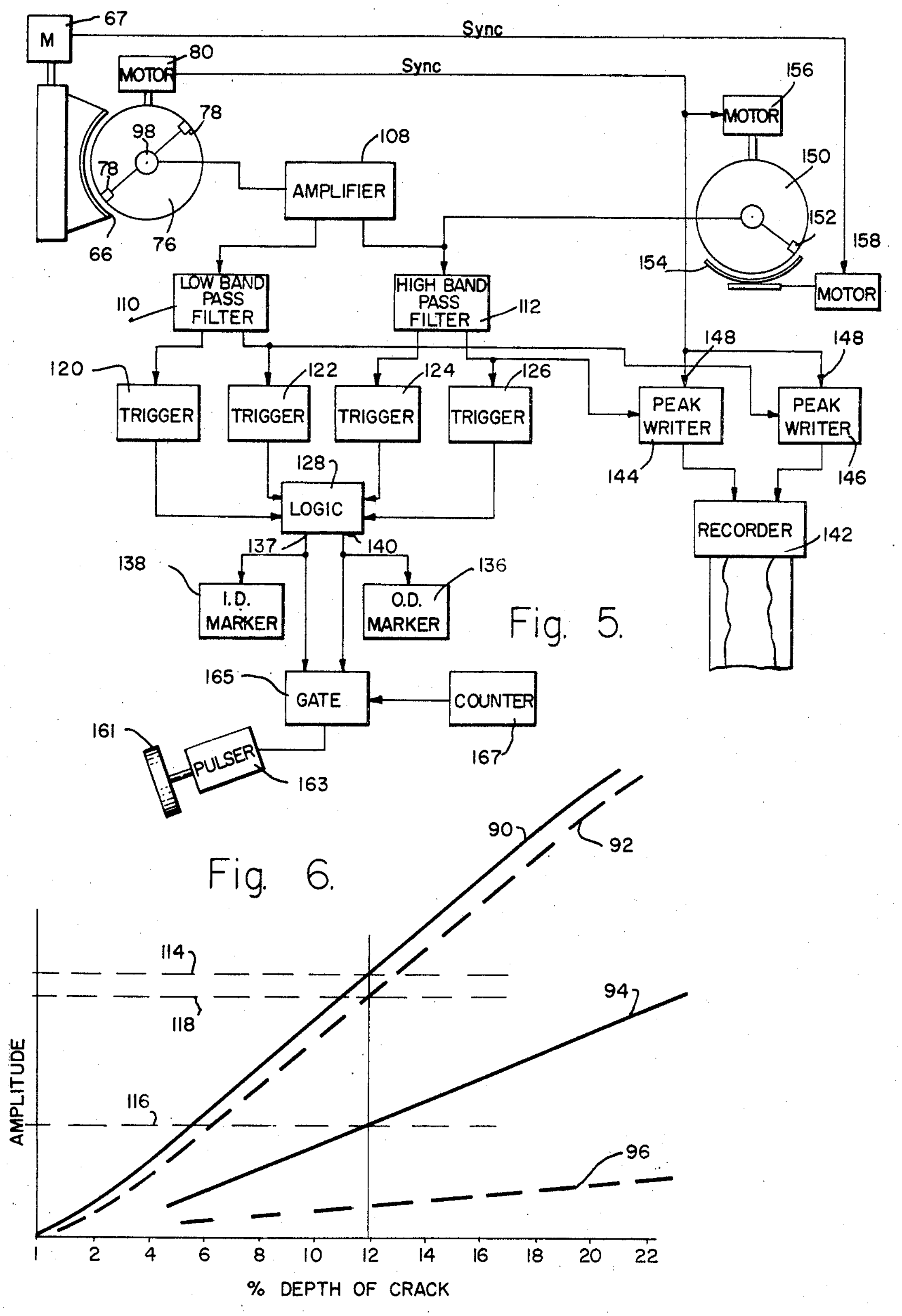
FIGURE 5 is a block diagram of the electronic portion of the inspection system of FIGURE 1.
FIGURE 6 is a graph of one set of operating characteristics of the system.

Referring to FIGURE 6, the solid line 90 represents the low frequency portion of an outside crack 24 signal while the dotted line 92 represents the high frequency portion of such a signal. The solid and dotted lines 94 and 96 represent, respectively, the low and high frequency portions of an inside crack signal. It will be seen both components in the outside crack signal are of considerably greater amplitude for a given depth. More particularly the low frequency component 90 for an outside crack 24 of say 6% depth (a generally acceptable crack) is about equal to the low frequency component 94 for an inside crack 26 of about 12% depth (a generally unacceptable crack). Also the ratios between the high frequency and low frequency components are considerably higher for the outside cracks than for the inside cracks. For example, in the case of an outside crack 24 the high frequency component 92 is in a region of about 90% of the low frequency component 90, while in the event of an inside crack 26 the low frequency component 94 is about 90% of the high frequency component 96.

The pickup probes 78 carried by the rotating turntable 76 is interconnected with the block diagram of FIGURE 5. The signals may be coupled from the rotating turntable by any suitable means such as slip rings and brushes, etc. However, it has been found this tends to introduce noise closely resembling some of the signals produced by the pickup 78. To avoid this difficulty it has been found desirable to utilize a contactless or rotary type of transformer 98. As best seen in FIGURE 3 this transformer 98 includes a two piece core 100 and 102. One core 100 is mounted on the turntable 76, substantially concentric with the axis of rotation. The second core 102 is stationary and mounted adjacent to the first core 100 coaxial and concentric therewith. A primary winding 104 is connected directly to the pickup 78 and is mounted on the rotating core 100 so as to be carried therewith. The secondary 106 is mounted on the stationary core 102 so as to be inductively coupled to the primary 104. As a result any signals produced by the probe 78 will be coupled into the secondary 106.

The secondary 106 is coupled to an amplifier 108 which increases the amplitude of the signal to a more useful level and improve the signal-to-noise ratio. This amplifier 108 preferably has a reasonably uniform response (i.e. gain) over a frequency range which includes both the high frequency and low frequency components described in connection with FIGURE 6.

Figure 8A:
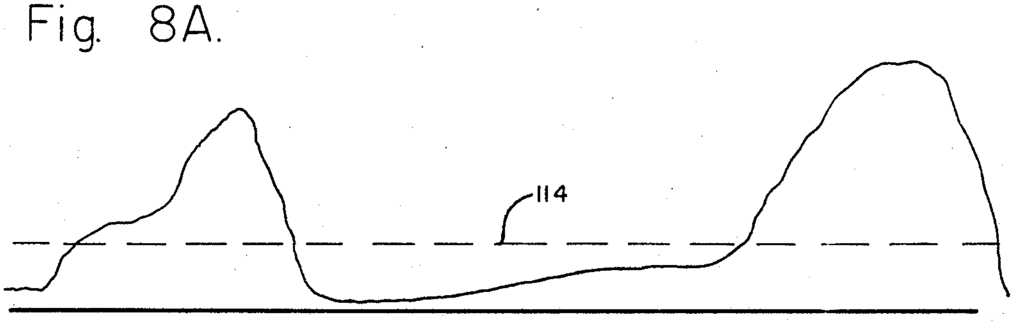
FIGURES 8A and 8B are graphs of another set of operating characteristics of the system as produced by the discontinuities of FIGURE 7.
Figure 8B:
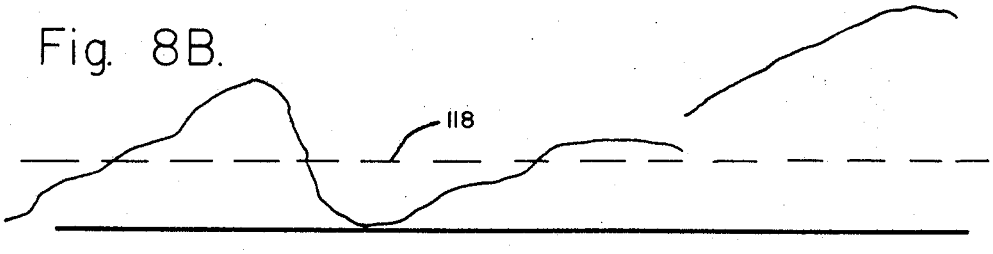

The output of the amplifier 108 is connected to filter means effective to divide the signal into the separate components. Although any desired number of components may be provided, in the present instance there are two separate filters 110 and 112 whereby the signal is divided into only two separate components. The first filter 110 is of the so-called low band pass variety while the second filter is of the so-called high band pass variety. The component provided by the low band pass filter 110 is shown by the solid lines 90 and 94 in FIGURE 6. Also this component is shown in FIGURE 8A. The component provided by the high band pass filter 112 is shown by the broken lines 92 and 96 in FIGURE 6 and in FIGURE 8B.

The exact limits of the pass bands are not particularly critical and will, to some extent, depend upon the rate at which the pipe 12 passes through the inspection station, the rate at which the pickup probe 78 travels across the belt 66, etc. It has also been found the two pass bands may overlap each other to some extent. One of the primary considerations is that the two bands be separate enough to produce components having characteristics that differ from each other as a function of the crack's location relative to the inside and outside surfaces 20 and 22.

When the depth of the outside crack 24 increases the amplitude of the low frequency component 90 increases linearly over most of its range and reaches the level 114 when the crack reaches the reject level (i.e. 12%). When this crack 24 reaches a depth of about one half the reject level (i.e. 6%) the signal is at a level of 116 or about one half the level of 114. The high frequency component 92 is of a somewhat comparable amplitude and passes through the levels 114 and 116 at comparable depths.

When the crack 26 is on the inside 22 the low frequency component 94 increases linearly with the depth of the crack 26 but at a considerably lower rate. For example, when the depth of the crack 26 reaches the reject level (i.e. 12%) the low frequency component 94 has just reached the level 116. This component 94 does not reach level 114 until the crack 26 has reached a level two or three times as deep as the acceptable limit. The high frequency component 96 increases at an even lower rate and never reaches either level 114 or 116.

It will be seen if the system merely sets a reject limit, such as level 114, pipes with inside defects of very serious magnitudes will be accepted. Conversely if the acceptable limit is set at level 116 the system will reject all of the pipes with inside defects above the acceptable limit. However, it will also reject a considerable amount of pipe with outside defects of minor consequence.

The present embodiment overcomes this difficulty by utilizing the relationship between the high frequency components and the low frequency components to determine whether a signal is produced by an inside defect 26 or an outside defect 24. This is accomplished by providing a pair of separate triggers 120 and 122 and 124 and 126 for each of the filters 110 and 112 and a logic circuit 128. These may all be substantially conventional circuits. The triggers 120 and 122 are set with levels which correspond to the dotted lines 114 and 118 in FIGURES 8A and 8B. (These correspond to the levels 114 and 118 in FIGURE 6.) In the event the filter 110 produces a low frequency component below this level 114 the trigger 120 will produce a signal while the second trigger 122 will not produce a signal. In the event the filter 110 produces a signal above this level 114 the first trigger 120 will not produce a signal but the second trigger 122 will.

The triggers 124 and 126 for the high frequency filter 112 are similar. More particularly if a signal below the level 118 occurs a signal will be produced by the trigger 124 but not by trigger 126. When a signal above this level occurs trigger 124 will not produce a signal but trigger 126 will.

The logic of the signal from the triggers 120, 122, 124, and 126 may be summarized briefly as follows. Signals from triggers 120 and 124 and not from triggers 122 and 126 indicate a discontinuity is present, but is smaller than the acceptable limit. Since this is acceptable it is not necessary to determine whether the discontinuity is on the inside surface 22 or outside surface 20. If trigger 120 does not produce a signal and trigger 122 does, an objectionable defect is present. If the trigger 124 produces a signal and trigger 126 does not, the defect is on the inside surface 22 but, if trigger 124 does not produce a signal while trigger 126 does, then the defect is on the outside surface 20.

The logic circuit 128 has a pair of separate outputs 137 and 140 coupled to the triggers 120, 122, 124 and 126 so as to respond to the foregoing combination of signals. The logic circuit 128 is, in turn, coupled to suitable output means for indicating the characteristics of the pipe. In the present instance this includes an inside marker 138 and an outside marker 136. These may be devices, such as paint spray guns, to provide a mark of one color, such as red for an inside defect and a mark of another color, such as yellow for an outside defect.

The logic circuit 128 which actuates these markers may be of any conventional design. For example, it may include a group of AND, OR, NOT, etc. gates for producing signals on the outputs 137 or 140 corresponding to the logic of the signals from the triggers 120, 122, 124 and 126 as explained above. It will be seen this will cause the pipe 12 to be marked according to whether or not it is defective and also as to whether the defect is on the inside or the outside.

In addition to marking the pipe or as an alternative thereto, it may be desirable to provide a permanent record of the inspection. In this event a recorder may be provided. In the present system 10 a two channel recorder 142 is coupled to the outputs of the two filters 110 and 112. This recorder 142 includes two separate pens or similar devices for drawing a permanent record of the low frequency component together which a second and separate recording of the high frequency component. These two recordings will resemble the curves in FIGURES 8A and 8B respectively. Preferably the recordings are on the same piece of paper and adjacent to each other. This will facilitate the operator visually reviewing the results and comparing the two components with each other so as to confirm the accuracy of the markings on the pipe. In addition, at some future date (for example, in the event of a failure of the pipe) the recordings can be reviewed to confirm the accuracy of the inspection.

It has been found that under some circumstances a particular part of a weld may include two separate defects. For example there may be two separate slag inclusions or two separate cracks, etc. The latter condition usually occurs when the trailing end of one long crack overlaps the beginning of a second long crack, either on the same side of the weld or on the inside and outside. In order to resolve this difficulty and eliminate confusion it has been found desirable to concentrate on the largest of two overlapping defects. This will insure all objectionable defects being noted. In addition if there are two successive or overlapping cracks they will be indicated as a single long crack requiring a single long repair. In the present instance this is accomplished by providing a peak writer 144 and 146 for each channel in the recorder 142. Each of the peak writers 144 and 146 is effective to sense the maximum amplitude of the signals being received and provide a DC or slowly varying signal corresponding to this peak. This type of a peak detector may be of conventional nature. For example, it may include a condenser that changes rapidly to a peak and retains the changes for a longer period. The stored signal is then used to operate the recorder.

The peak writers 144 and 146 are preferably coupled to the turntable 76 or the motor driving the table. After each pass of a pickup probe 78 across the belt 66, the sync signal on the inputs 148 of the peak writers 144 and 146 clear themselves, i.e. the condensers are discharged. Thus the peak writers 144 and 146 will record only the maximum amplitude of the largest signal occurring during each scan. Thus, even though there may be two parallel cracks side by side, the amplitude of only the most important crack will be recorded.

As a further alternative or a supplement, a second permanent record may be made of the signals produced by the amplifier 108. In the present instance this is accomplished by providing a second turntable 150 having a recording pen 152 thereon. The second turntable 150 is driven by a motor 156 synchronized with the motor 67 driving the first turntable 84. This insures the pen 152 sweeping across a paper tape 154 in synchronism with the pickup 78 on the first turntable 76. In addition, the paper tape 154 may be advanced past the turntable 150 by a drive motor 158 synchronized with the motor 80 driving the magnetic belt 66. As a consequence a one-to-one recording is provided on the tape 154. This tape 154 may be laid along the pipe 12 adjacent the welded seam 14. If there are any questionable recordings they will be aligned directly with the questionable area in the weld. This area may then be carefully manually inspected so as to confirm the accuracy of the indications.

In order to use this system for inspecting a pipe the pipe is carried along the conveyor 30 and through the inspection station 34. Before the pipe enters the station 34, the inspection head 36 is raised. Accordingly the leading end of the pipe does not touch the belt. This prevents any burrs, hooks, etc. on the end cutting or otherwise damaging the belt. When the roller 44 engages the end of the pipe 12 the switch 46 lowers the head 36 into the test position whereby the belt 66 engages the welded seam 14.

The resilient tread 74 causes the belt 66 to wrap around a considerable portion of the pipe 12 and record any stray magnetic fields in the seam or on either side thereof. Normally the pipe 12 and scan 14 are relatively straight. However, if either the pipe and/or seam is twisted, the belt wraps far enough around either side to insure recording all of the stray fields from the weld 14.

As the belt rotates around the loop it first passes between the erase head 159 where all prior recordings are removed and then onto the pipe 12. It then passes between the brushes 160 where any loose scale, dirt, etc. is removed from the belt 66. This protects the various parts of the system from damage. Also, by placing the turntable inside of the loop the pickups 78 are on the side opposite from that contacting the pipe 12 and picking up dirt. It has also been found desirable for the magnetic particles for recording the stray fields to be on the inside of the loop and protected from abrasion.

The belt 66 then travels past the turntable 76 where the pickup heads 78 scan the belt 66 and couple signals to the amplifier 108. The filters 110 and 112 separate the signals into the different components. The various trigger circuits 120, 122, 124 and 126 and the logic circuit 128 respond to the components and cause the markers 136 and 138 to indicate on the pipe the location and nature of the defects.

At the same time the signals from the filters 110 and 112 are fed to the peak writers 144 and 146. These peak writers 144 and 146 produce signals having amplitudes equal to the maximum amplitudes of the components occurring during each scan. The sync signal coupled to the inputs 148 represents the completion of a scan by a pickup head 78 and clears the peak writers 114 and 146. It will thus be seen that the two channel record 142 produces a dual recording corresponding to signals 8A and 8B.

Also, at the same time, the paper tape 154 is driven past the turntable 150 by the motor 158 in synchronism with the belt 66 whereby the paper tape travels identical to the motion of the pipe 12. The turntable 150 is driven by the motor 156 in synchronism with the turntable 76 so as to produce a series of transverse lines across the tape 154 corresponding to the signals picked up by the probes 78. This, in effect, will result in a one-to-one plan view of the characteristics of the welded seam. This very closely resembles in appearance a typical radiograph of a welded seam and may be used in a similar manner.

Under some circumstances it is desirable for quality control, statistical or other purposes to keep track of the location and/or number of deflects present in a welded seam. In the present instance this is accomplished by providing a wheel 161 which rolls on the bottom of the pipe 12 and actuates a pulser 163. This produces a signal each time the pipe 12 travels a fixed distance, such as one inch. A counter 167 is coupled to the pulser accumulating a count of the number of pulses produced. This counter 167 is coupled to a gate 165 actuated from the outputs 137 and/or 140 of the logic circuit 128. This counter 165 thereby accumulates a count of the pulses only when an objectionable defect is present. This will provide an accumulation of counts corresponding to the total number of inches of defective weld per section of pipe, per feet of pipe inspected, per hour or shift, etc.

While only a single embodiment of the present invention is disclosed herein it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:

1. An inspection system for inspecting workpieces for defects, said system including the combination of an inspection station, a conveyor for carrying the workpieces through the inspection station, means for magnetizing the workpieces whereby there are stray fields present adjacent the surface of the workpiece in the region of any defects, magnetic recording means in said inspection station, said recording means including an endless flexible belt having a recording medium thereon for recording magnetic fields, means for rolling the belt longitudinally along the surface of the magnetized workpiece as it passes through said inspection station, said last means being effective to force a first segment of the belt into intimate contact with an inspection area on the surface of the workpiece whereby the stray fields about the workpiece are recorded upon said medium, guide means effective to form a second segment of the belt having the stray field previously recorded thereon into a cylindrical shape having an axis parallel to the direction of travel of the belt, pickup means mounted to rotate about the axis of the cylindrical shape and scans said belt and the recordings thereon in a direction transverse to the direction of travel of the belt and produce a signal which is a function of the recordings on said belt and the stray fields on said inspection area, peak detector means coupled to said pickup means and responsive to the signal therefrom, said peak detector means being effective to store the maximum amplitude of the signal occurring during each scan of the pickup means across the second segment, said peak detector means being effective during each scan of the pickup means across the second segment to produce an output signal which is a function of the stored signal.

2. The combination of claim 1 including means responsive to the scanning of the pickup means across said belt, said means being coupled to said peak detector means and effective to remove the stored signal each time a scan across the belt is completed by the pickup means whereby the output signal has a duration corresponding to the length of the belt having a stray field recorded thereon and has an instantaneous amplitude corresponding to the maximum stray field traversed by the pickup means during each scan.

3. The inspection system of claim 2 including output means coupled to the peak detector means and effective to record the output signal therefrom.

4. An inspection system for inspecting a workpiece for defects, said system including the combination of means for magnetizing the workpiece whereby stray fields are present adjacent the surface of the workpiece in the regions of any defects, a flexible magnetic recording medium for being forced in intimate contact with said surface for recording magnetic fields thereon, pickup means for repeatedly scanning said recording medium and producing a defect signal corresponding to the stray fields, peak detector means coupled to said pickup means and effective to store a signal corresponding to the maximum amplitude of the defect signal occurring during each scan, said peak detector being effective to produce an output signal which is a function of said stored signal, and means responsive to the scanning of the pickup means across said belt, said means being coupled to said peak detector means and effective to remove said stored signal each time a scan across the belt is completed by the pickup means whereby the output signal has an amplitude corresponding to the maximum amplitude occurring during each scan.

References Cited

UNITED STATES PATENTS

| | | | |
|---|---|---|---|
| 2,109,455 | 3/1938 | Barnes et al. | 324—37 |
| 3,262,053 | 7/1966 | Nasir et al. | 324—37 |
| 3,343,079 | 9/1967 | Crouch | 324—37 |
| 3,341,771 | 9/1967 | Crouch et al. | 324—37 |

FOREIGN PATENTS

| | | |
|---|---|---|
| 690,476 | 6/1964 | Canada. |

ALFRED E. SMITH, Primary Examiner

U.S. Cl. X.R.

346—33